United States Patent
Ross, Jr. et al.

[11] Patent Number: 5,907,273
[45] Date of Patent: May 25, 1999

[54] LINEAR POSITIONING INDICATOR

[75] Inventors: Herbert G. Ross, Jr., Argyle; Carl A. Taylor; Cecil M. Williamson, both of Carrollton, all of Tex.

[73] Assignee: Rochester Gauges, Inc., Dallas, Tex.

[21] Appl. No.: 08/936,592

[22] Filed: Sep. 24, 1997

Related U.S. Application Data

[63] Continuation-in-part of application No. 08/623,023, Mar. 28, 1996, Pat. No. 5,812,048, which is a continuation-in-part of application No. 08/599,463, Jan. 22, 1996, which is a continuation-in-part of application No. 08/485,717, Jun. 7, 1995, abandoned, which is a continuation-in-part of application No. 08/157,906, Nov. 24, 1993, abandoned.

[51] Int. Cl.$^6$ ...................................................... H01C 10/38
[52] U.S. Cl. .......................... 338/176; 338/160; 338/118; 338/254; 338/211; 338/212; 338/313
[58] Field of Search ...................................... 338/128, 118, 338/123, 125, 126, 131, 132, 133, 134, 160, 203, 254, 211, 212, 312, 313, 320, 176, 177; 29/610.1, 620, 621, 844, 845

[56] References Cited

U.S. PATENT DOCUMENTS

| | | |
|---|---|---|
| 885,675 | 4/1908 | Martin . |
| 903,212 | 11/1908 | Martin . |
| 1,189,869 | 7/1916 | Remy et al. ............................. 73/313 |
| 1,304,022 | 5/1919 | Cole . |
| 1,316,341 | 9/1919 | Vosika . |
| 1,792,641 | 2/1931 | Huggins . |
| 1,950,142 | 3/1934 | Hastings et al. ....................... 116/118 |
| 2,097,278 | 10/1937 | Hastings ................................. 73/317 |
| 2,098,085 | 11/1937 | D'Arcey ................................. 73/317 |
| 2,201,974 | 5/1940 | Andersson ............................. 137/104 |
| 2,473,581 | 6/1949 | Ford ....................................... 177/327 |
| 2,524,261 | 10/1950 | Kaminky ................................ 200/84 |
| 2,634,608 | 4/1953 | Sorber .................................... 73/305 |
| 2,654,253 | 10/1953 | Ford ........................................ 73/431 |
| 2,669,123 | 2/1954 | Ballard ................................... 73/317 |
| 2,678,060 | 5/1954 | Arne ....................................... 137/452 |
| 2,697,350 | 12/1954 | Sorber .................................... 73/317 |
| 2,761,467 | 9/1956 | Arne ....................................... 137/452 |
| 2,784,273 | 3/1957 | Binford .................................. 200/84 |

(List continued on next page.)

FOREIGN PATENT DOCUMENTS

| | | |
|---|---|---|
| 0168211 | 1/1986 | European Pat. Off. . |
| 2480937 | 10/1981 | France ..................................... 73/313 |
| 2534375 | 9/1983 | France . |
| 42 43 751 A1 | 6/1994 | Germany . |
| 0166216 | 10/1983 | Japan . |
| 724338 | 2/1955 | United Kingdom . |
| 1380031 | 1/1975 | United Kingdom . |
| WO 93/25869 | 6/1993 | WIPO . |

OTHER PUBLICATIONS

Penny & Giles Position Sensors, Ltd., "Product Data–Cylinder Transducer Model HLP100,"Oct. 1990.
Penny & Giles Position Sensors, Ltd., "Product Data–Hybrid Track Rectilinear Potentiometers,"Apr., 1989.
Penny & Giles Potentiometers, Ltd., Product Brochure, Sep., 1987.
U.S. Statutory Invention Registration H 133.
SAE Paper "Conductive Thermoplastic Fuel Level Sensor Element," Feb. 26–29, 1996.
Deakyne, et al., Jul. 5, 1994.

*Primary Examiner*—Michael L. Gellner
*Assistant Examiner*—Karl Easthom
*Attorney, Agent, or Firm*—Sidley & Austin

[57] ABSTRACT

Use is made of thermoplastic materials in layered configurations as a thermally stable, rigid but not brittle strip of lengths of six inches to ten feet or more. The layered strip contains layers of conductive fibers in a resin matrix, which, through use of appropriate contact mechanisms and wiring, provide an assembly with an infinite potentiometer scale. The strips are especially useful in linear positioning indicators such as pneumatic and hydraulic cylinder and liquid level gauges. The strips are conductively connected by cutting a bias surface relative to said strips and placing resin thereon.

5 Claims, 3 Drawing Sheets

U.S. PATENT DOCUMENTS

| | | | |
|---|---|---|---|
| 2,820,865 | 1/1958 | McKinnies | 200/84 |
| 2,992,560 | 7/1961 | Morgan et al. | 73/317 |
| 3,113,282 | 12/1963 | Coleman | 338/33 |
| 3,132,331 | 5/1964 | Boddy | 340/244 |
| 3,266,312 | 8/1966 | Coleman et al. | 72/313 |
| 3,320,922 | 5/1967 | Taylor et al. | 116/118 |
| 3,326,042 | 6/1967 | Ross et al. | 73/290 |
| 3,364,321 | 1/1968 | Gessner | 200/83 |
| 3,412,609 | 11/1968 | Kaletka et al. | 73/308 |
| 3,688,795 | 9/1972 | Taylor et al. | 137/558 |
| 3,709,038 | 1/1973 | Werner | 73/313 |
| 3,739,641 | 6/1973 | Taylor et al. | 73/313 |
| 3,826,139 | 7/1974 | Bachman | 73/311 |
| 3,942,526 | 3/1976 | Wilder et al. | 128/214 |
| 3,969,941 | 7/1976 | Rapp | 73/290 R |
| 3,972,235 | 8/1976 | Frayer | 73/311 |
| 4,064,907 | 12/1977 | Billington et al. | 137/614.2 |
| 4,142,419 | 3/1979 | Fenne et al. | 73/440 |
| 4,186,419 | 1/1980 | Sims | 361/178 |
| 4,199,745 | 4/1980 | Barry | 338/320 |
| 4,223,190 | 9/1980 | Olson | 200/84 R |
| 4,313,459 | 2/1982 | Mylander | 137/416 |
| 4,329,550 | 5/1982 | Verley | 200/84 |
| 4,441,860 | 4/1984 | Tsujimoto | 417/40 |
| 4,466,284 | 8/1984 | Dumery | 73/313 |
| 4,483,367 | 11/1984 | Ross, Jr. et al. | 137/416 |
| 4,513,617 | 4/1985 | Hayes | 73/313 |
| 4,554,494 | 11/1985 | Howeth | 318/482 |
| 4,569,786 | 2/1986 | Deguchi | 252/503 |
| 4,635,480 | 1/1987 | Hrncir et al. | 73/322.5 |
| 4,641,523 | 2/1987 | Andreasson | 73/313 |
| 4,658,234 | 4/1987 | Takayanagi | 338/260 |
| 4,688,587 | 8/1987 | Bourgeon | 137/2 |
| 4,724,705 | 2/1988 | Harris | 73/313 |
| 4,743,321 | 5/1988 | Soni et al. | 156/85 |
| 4,749,981 | 6/1988 | Yui et al. | |
| 4,778,957 | 10/1988 | Crowell | 200/84 R |
| 4,782,699 | 11/1988 | Gonze | 73/308 |
| 4,788,523 | 11/1988 | Robbins | 338/309 |
| 4,812,804 | 3/1989 | Masaki | 338/200 |
| 4,829,667 | 5/1989 | Thompson et al. | 29/858 |
| 4,835,509 | 5/1989 | Yoshino et al. | 338/32 R |
| 4,861,653 | 8/1989 | Parrish | 428/288 |
| 4,864,273 | 9/1989 | Tsuzuki et al. | 338/174 |
| 4,870,746 | 10/1989 | Klaser | 29/620 |
| 4,911,011 | 3/1990 | Fekete et al. | 73/313 |
| 4,920,798 | 5/1990 | Weaver | 73/313 |
| 4,960,841 | 10/1990 | Kawabata et al. | |
| 4,967,181 | 10/1990 | Iizuka et al. | 340/450.2 |
| 4,987,400 | 1/1991 | Fekete | 338/164 |
| 5,026,748 | 6/1991 | Adams | 524/66 |
| 5,037,697 | 8/1991 | Fujisawa | 428/373 |
| 5,050,433 | 9/1991 | Lumetta | 73/313 |
| 5,066,430 | 11/1991 | Matthews | 264/8 |
| 5,072,618 | 12/1991 | Taylor et al. | 73/317 |
| 5,079,950 | 1/1992 | McKiernan et al. | 73/313 |
| 5,137,677 | 8/1992 | Murata | 264/272.16 |
| 5,138,881 | 8/1992 | Riley et al. | 73/304 R |
| 5,145,732 | 9/1992 | Kyutoka | 428/36.1 |
| 5,146,785 | 9/1992 | Riley | 73/313 |
| 5,196,824 | 3/1993 | Helm | |
| 5,236,779 | 8/1993 | Sheer | 428/323 |
| 5,283,113 | 2/1994 | Nishimura | 428/280 |
| 5,290,522 | 3/1994 | Rogers | 422/179 |
| 5,292,460 | 3/1994 | Kyutoku | 264/29.5 |
| 5,338,602 | 8/1994 | Sheer | 428/323 |
| 5,380,580 | 1/1995 | Rogers | 428/219 |
| 5,419,864 | 5/1995 | Sheer | 264/254 |
| 5,455,556 | 10/1995 | Ohm et al. | 338/309 |

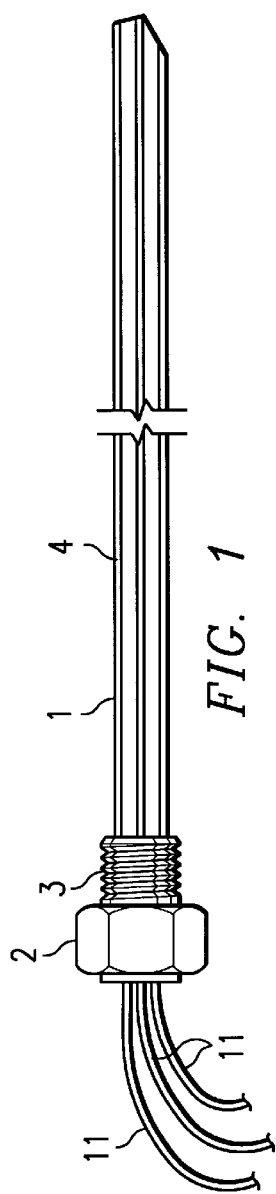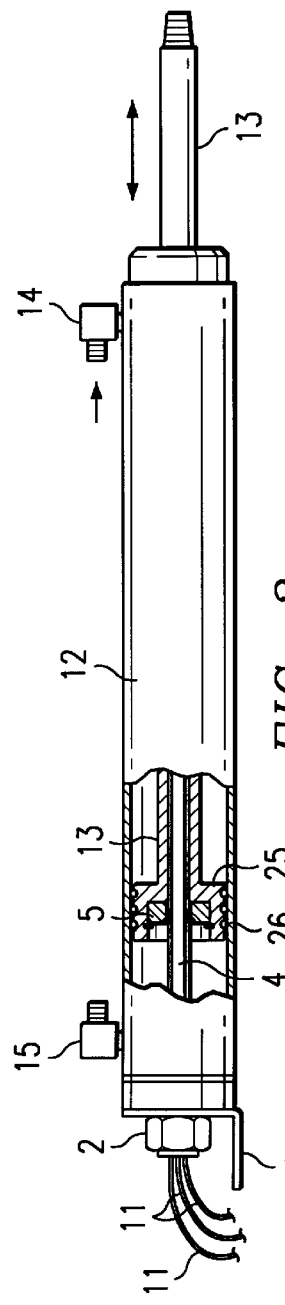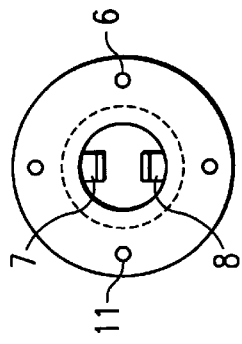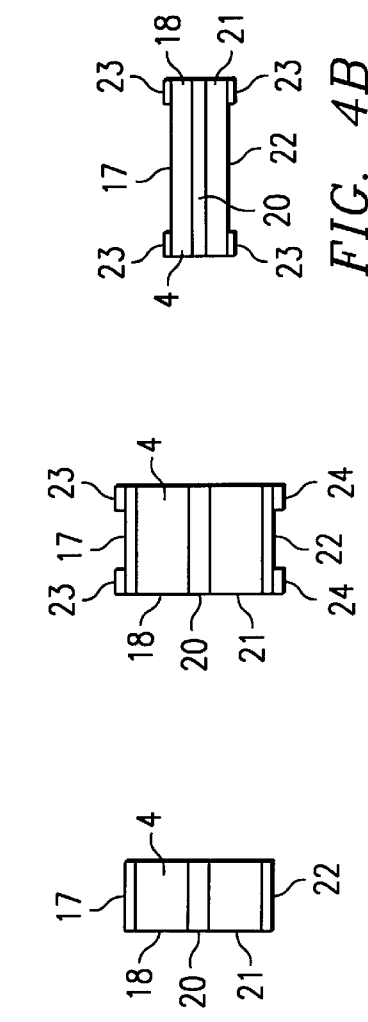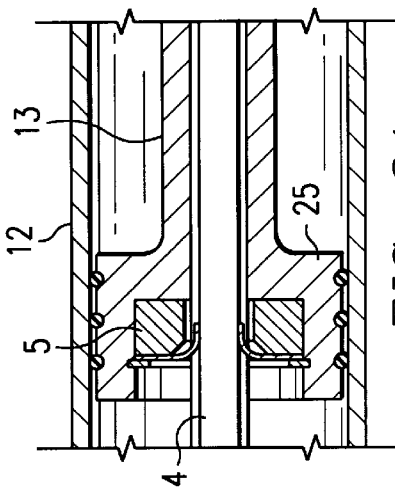

LINEAR POSITIONING INDICATOR

CROSS REFERENCE TO RELATED APPLICATIONS

This application is a continuation in part of U.S. application Ser. No. 08/623,023 filed Mar. 28, 1996, now U.S. Pat. No. 5,812,048, which was a continuation in part of pending U.S. application Ser. No. 08/599,463, filed Jan. 22, 1996, which is a continuation in part of U.S. application Ser. No. 08/485,717 filed Jun. 7, 1995, now abandoned, which is a continuation in part of U.S. application Ser. No. 08/157,906 filed Nov. 24, 1993, now abandoned.

TECHNICAL FIELD OF THE INVENTION

This invention relates to linear positioning indicators, in particular positioning indicators utilizing a potentiometer mechanism to generate a signal indicative of position of a device within a working system. More in particular, the linear positioning indicator of this invention embodies a corrosion resistant material that can be inexpensively utilized.

BACKGROUND OF THE INVENTION

Linear positioning indicators find numerous uses in manufacturing processes and materials handling systems. While such indicators can be visual readout only, numerous uses are made of indicators that can provide a remote signal for display and/or control purposes. Linear positioning indicators are especially useful in conjunction with hydraulic and pneumatic cylinders, providing a means of generating a signal that represents the positioning of a cylinder piston along the stroke of the cylinder.

Linear positioning indicators are also useful in liquid level gauges, such as described in the related applications referred to above, the specifications of which are incorporated here by reference as if a part of the present specification. In particular, the conductive/resistive element described in those specifications has been found to have use in more general applications as described therein and here. Examples of linear positioning indicators follow the article by A. L. Hitchcox in *Hydraulics and Pneumatics*, May, 1995, p. 38.

SUMMARY OF THE INVENTION

Linear positioning indicators utilizing a partially conductive plastic material offering excellent resistance to most chemicals and fuels can be formed into a variety of shapes and sizes to accommodate the needs of the use at hand. While the application of the plastic material lends itself to both current (ammeter) and voltage (voltmeter) systems, the discussions herein are directed to those with voltage output.

Use of the plastic materials herein provides for useful linear positioning indicators having cost savings both in materials and in the manner of assembly. Typical properties of the plastic—thermoplastic is preferred—material include a tensile strength of 62 MPa, a low elongation percentage of 0.06%, a flex modulus of about 10 GPa(Kpsi), a density of 1.82, a melt temperature of 285–315° C. and a volume resistivity of 0.05–15 ohms/cm. Resistance variations along the conductive thermoplastic strip ranges from 2–5% with the preferred linearity variations of less than about 3%.

The present invention is preferably used in conjunction with a voltage source and a voltage indicator and comprises an elongate thermoplastic strip having a number of alternating layers of conductive/resistive material and nonconductive material. A first layer of conductive material has one end connected to a first terminal of the voltage source and the second end is connected to a second terminal of the voltage source via a second conductive layer. A third conductive layer is connected to one terminal of the high impedance voltage indicator. Nonconductive layers separate the conductive\resistive layers of thermoplastic material. A contact assembly moveable along the length of the thermoplastic layered strip provides a conductive connection between the first and third layers. Thus, the assembly can provide an indication of the linear position of a third related device by the positioning of the contact assembly along the thermoplastic strip. The three conductive/resistive layers are separated by nonconductive layers of similar material.

BRIEF DESCRIPTION OF THE DRAWINGS

The above and other advantages of the invention will become more apparent from the description taken in conjunction with the following drawings wherein like reference numerals refer to like parts.

FIG. 1, FIG. 2 and FIG. 2A represent an embodiment of an internal fitting potentiometer;

FIG. 3 depicts a fluid cylinder having the embodiment shown in FIGS. 1 and 2;

FIG. 3A is a partial cutaway of the fluid cylinder in FIG. 3;

FIGS. 4–4B represent various cross section embodiments of the elongated strip in FIG. 1;

DETAILED DESCRIPTION

Figure 5:
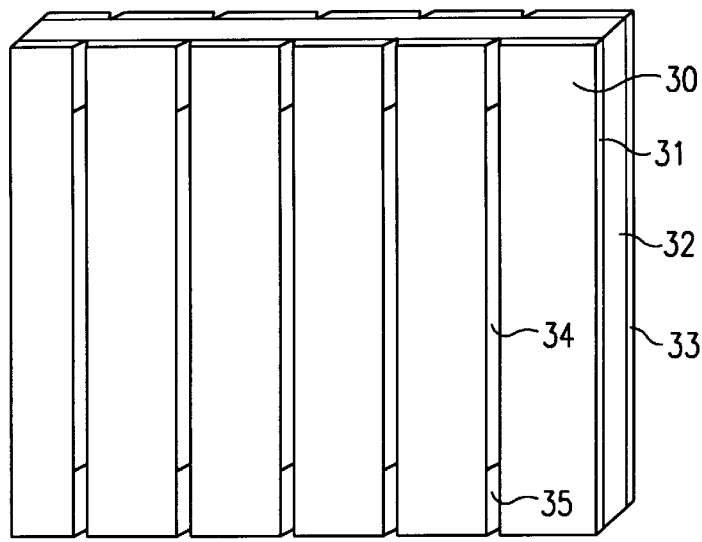
FIGS. 5 and 5A represent an embodiment of the layered thermoplastic material for multiple potentiometer usage.

In the embodiment shown in FIG. 1, a five layered strip of thermoplastic material 4 is positioned in the end of a head assembly 2, with wiring 11 being attached to the end portions of the conductive/resistive layers 17, 20 and 22 (see FIG. 4). The wires can be attached in the conventional manner to a voltage supply and high resistance voltmeter and calibrated in a useful setting to show the linear position of some machinery part relative to given conditions. In the embodiment shown in FIGS. 1 and 2, the potentiometer assembly including the contact assembly 5 can be mounted internally to a fluid cylinder 12 depicted in FIG. 3 by means of threads 3 corresponding to threads in the end of the fluid cylinder 12.

As depicted in FIG. 3A, the contact assembly 5 can be mounted in the end of piston 25 which moves linearly in cylinder 12 by the relative movement of fluid between the two chambers formed in the cylinder by said piston 25. The contact disc 6 mounted to assembly 5 by brads or screws 11 has internal contact elements 7 and 8 (see FIGS. 2 and 2A) which are in sliding contact with the strip 4 when mounted in the end of the cylinder assembly 12. Contact disc 6 can be of known conductive material that provides sliding contact along the layered strip 4 or may consist of flexible material coated with conductive elements such as gold, silver, copper, palladium, platinum, nickel or alloys thereof.

The contact assembly can be held in place by conventional means. As the piston moves along the cylinder a variation in voltage potential is caused by the sliding contact of elements 7 and 8 along layers 17 and 22 when the wires 11 are connected to a voltage source and voltmeter. The voltage variation is calibrated to provide linear positioning of the piston 25 within cylinder 12. That calibration can determine the position of shaft 13 or any device connected to the end of shaft 13.

FIG. 4 depicts layers 17, 20 and 22 of conductive/resistive polymeric material separated by nonconductive layers 18 and 21. The length of the layered strip 4 can be determined by the device it is associated with, here a fluid cylinder. In operation, the strip must be at least long enough to provide contact with elements 7 and 8 along the strip for the full length of the stroke of the piston. The shaft 13 is counter-bored sufficiently to accommodate the strip 4 for the full length of the stroke. The strip embodiments in FIGS. 4A and 4B have additional nonconductive outer layers 23 and 24 with the center portions of the layers removed to expose conductive material to the contact elements. These two embodiments are useful for extra long stroke cylinders. where the edges of the layers that remain provide support within the counterbore of the shaft. The nonconductive edges prevent possible shorting of the potentiometer circuitry along the shaft.

Polymeric strip element 4 is made of polymeric material which preferably can be molded and machined as necessary. Suitable materials include thermoplastics such as polyester (preferably polyethylene terephthalate), polyamide, acrylics, copolyesters (such as DuPont's Hytrel), polyolefins such as polypropylene and polyethylene, partially cross-linked halogenated polyolefin alloys. Conductive fibers may be added to the polymeric material to form an electrical conductivity along layers containing the fibers. Filler materials such as glass fibers may also be added for structural integrity.

Preferably, the polymeric conductive/resistive strips are formed of layers of the same material, such as polyester (PET), alternate layers having or lacking conductive fibers according to design. In FIG. 4, layers 17, 20 and 22 contain such conductive fibers while layers 18 and 21 do not. All layers may contain glass fiber or other suitable filler, however. The use of conductive fibers improves the linearity of the sensitivity of the strip. It is believed the overlay of the fibers on each other within the resin matrix caused the resistivity level along the layers to consistently remain within less than about 5% and as linear to 2 to 3%. The conductive fibers also add lubricity to the surface to the conductive layers providing little resistance to sliding contact materials on the surface of the layer.

The conductive fibers preferably are mesophase pitch carbon fiber and are mixed with glass fibers in the thermoplastic polyester material and formed into a batting. The carbon filler preferably exhibits a lamellae microstructure and is randomly disposed throughout the conductive layer and on the surface of the layer. Alternate layers of batting containing conductive fibers and nonconductive batting can be formed under pressure and temperature in a standard compression molding machine or continuously molded through a pressure related belt molding machine. Different grades of batting can be used to obtain the desired overall conductivity/resistivity of the layers in element 4. DuPont, for example, manufactures grades of batting material useful in this invention in the range of 0.05 to 15 ohm-cm conductivity. Typical of such fiber battings is the pitch fiber batting disclosed in U.S. Pat. No. 4,861,653 sold by DuPont under the tradename Ryonite®. The batting CRS09RE5222BK570 when formed under pressure and temperature will have a volume resistivity of 15 ohms-cm.

Alternatively Ryonite SC 500 has a volumentric resistivity of 0.05 ohm-cm. Layers of molded batting can be formed from such fiber having a range of resistivity differential along the layer of 2–3%. Layering of the battings provides a ready engineered strip according to the end use, including structural rigidity without the brittleness in long lengths formed in prior art devices.

Figure 6:
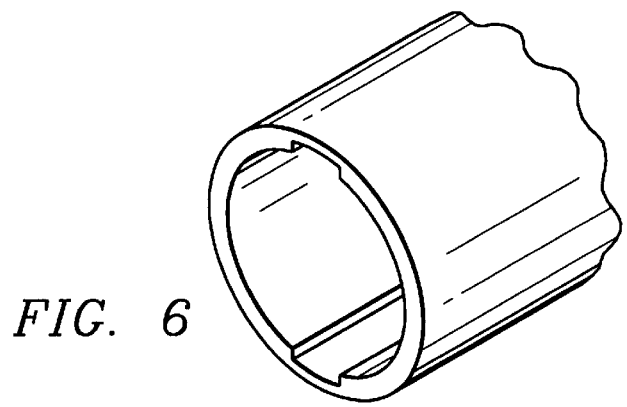
FIG. 6 is a housing for use with an internally positioned contact assembly useful for external applications.

While the above has been discussed in connection with internally mounted linear positioning indicators, usage can also be made externally by the use of cylinder 26 in FIG. 6. Slots 27 and 28 molded in the inner surface of the cylinder hold strips of layered conductive/resistive material. Internally positioned contact means establish contact between mounted strips in slots 27 and 28. A return conductor can be formed in one of the strips and separated from the contacting layer by nonconductive material.

Figure 5A:
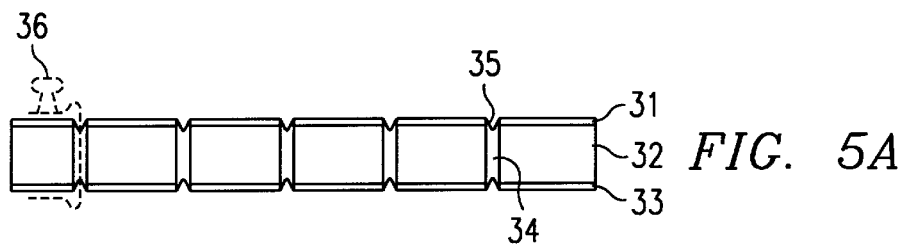

The embodiment in FIGS. 5 and 5A depicts the use of layered polymeric material to form a multiple potentiometer usage. Conductive layers 31 and 33 are separated by nonconductive layer 32 to form a board 30. The layers 31 and 33 are segmented by notches 35 in a manner to separate the layers conductively. Slots 34 are formed in the board 30 to allow contact means 36 shown in phantom lines. The ends of conductive layer segments 31 and 33 can be connected with a voltage source and voltmeter as described earlier and in a manner that several linear potentiometers can be inexpensively grouped together.

Figure 7:
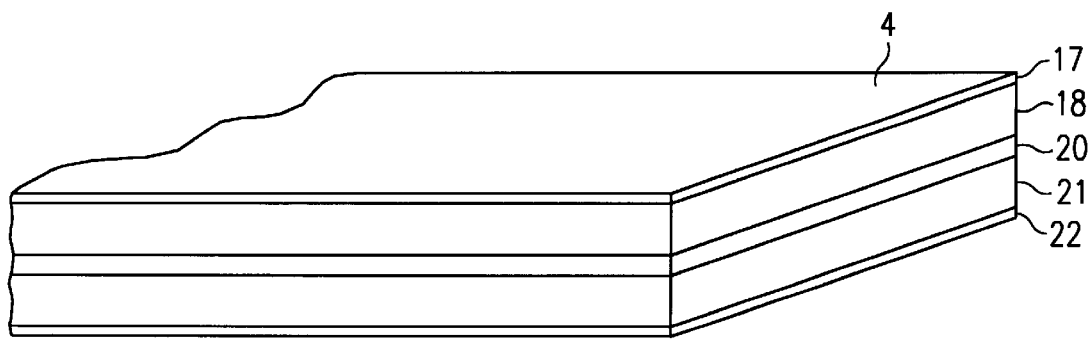
FIGS. 7–10A depict a useful method for electrically connecting two of three conductive layers in the thermoplastic strip material.
Figure 8:
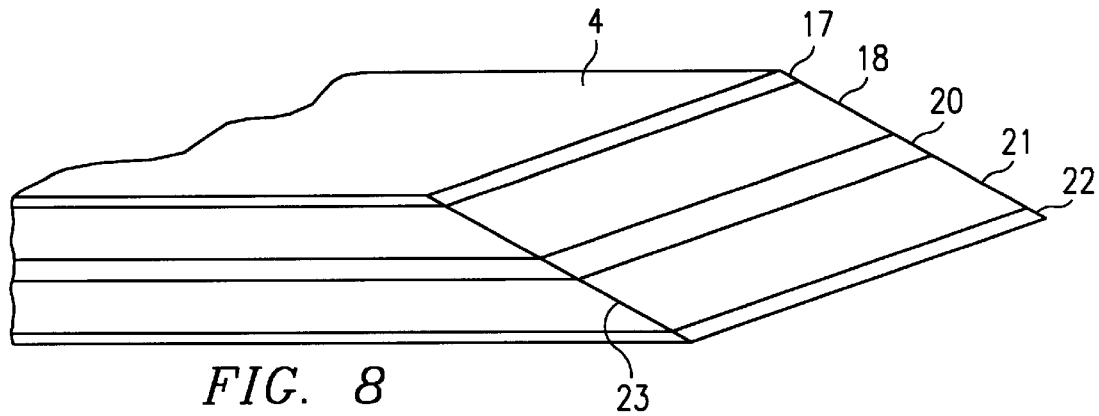
Figure 9:
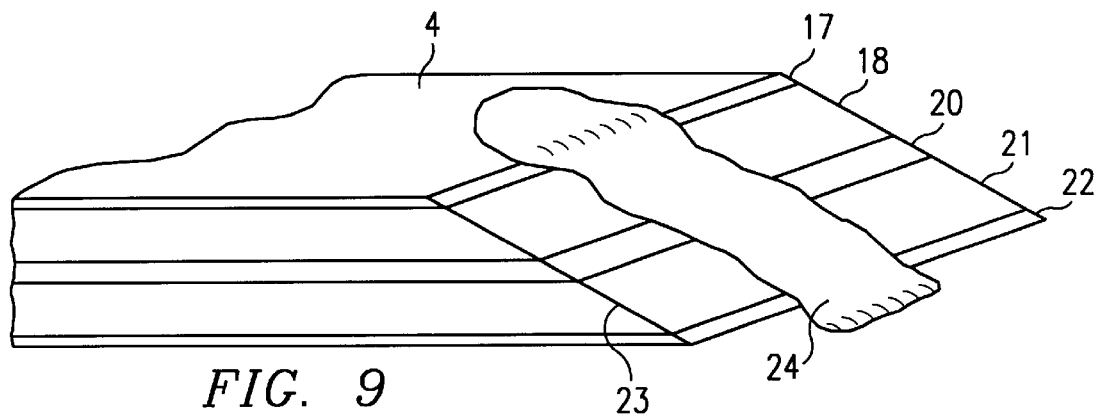
Figure 10:
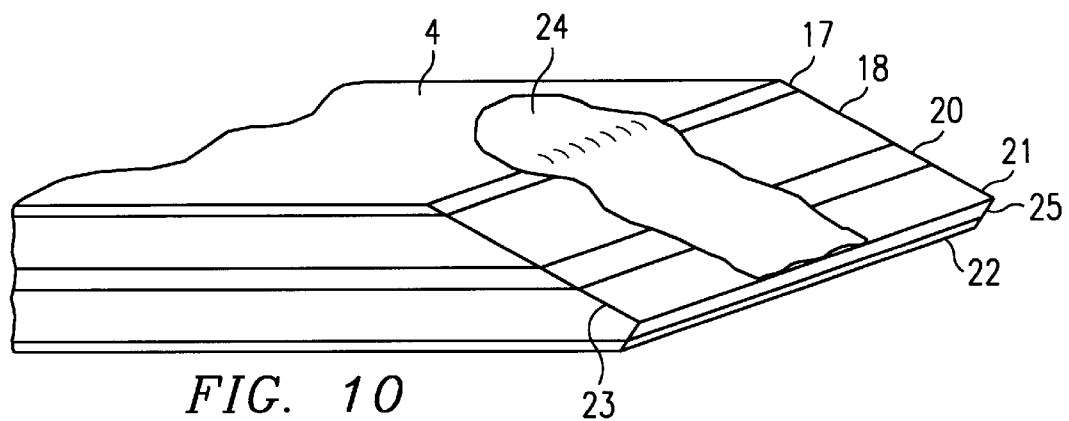
Figure 10A:
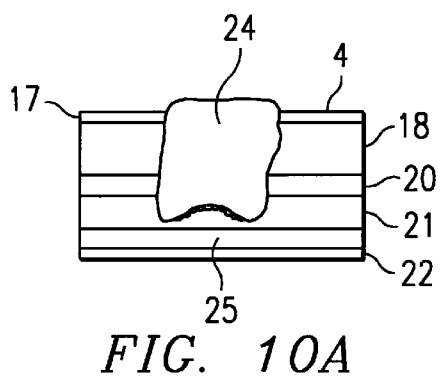

FIGS. 7 through 10A depict a particularly useful way of connecting conductive layers 17 and 20 in the elongate strip 4. FIG. 7 represents the end of such a strip 4 comprising layers of conductive batting 17, 20 and 22 separated by nonconductive layers 18 and 21. The process of providing for the electrical connection of layers 17 and 20 begins with cutting the end of the strip 4 on a bias 23 as shown in FIG. 8. The bias preferably is at an angle between 30° and 60° to the longitudinal axis of strip 4. Other angles may also be used. A purpose of the bias cut is to increase the exposed surface area of the ends of the layers, thus allowing increased area for connection of the desired conductive layers. As shown in FIG. 9, a conductive epoxy 24 is then placed on the bias cut 23 and allowed to set. The conductive epoxy 24 is applied such that it covers at least the desired conductive layers to be connected and is continuous between these layers thereby connecting them electrically. The epoxy 24 may cover the entire or only a portion of the exposed end, but is shown in FIG. 9 only over a portion of the end for purposes of clarity of illustration. As shown in FIG. 9, the conductive epoxy 24 covers and connects all three of the conductive layers 17, 20, and 22. When the epoxy material has set, a reverse bias cut is made in the manner shown in FIG. 10 to provide a break in connection between the epoxy and layer 22 that may have occurred when the epoxy was administered. This reverse bias is an easy manner to ensure that the connection to layer 22 is broken, if desired. The reverse bias need not be cut at an angle but can be cut perpendicular to the long axis if strip 4 or any other angle is sufficient to break the electrical connection by the epoxy with the other layers. A reverse bias cut is not necessary if the epoxy is carefully applied so as to connect only the layers desired to be connected. However, the method of applying the epoxy to full length of the bias cut and then making the reverse bias cut is very advantageous, in that it allows large quantities to be made more rapidly. FIG. 10A is an end view of FIG. 10 showing that the connection of the conductive epoxy 24 with layer 22 has been severed. Layers 17 and 20 can then be connected to a voltage source, while signal output can be fed to a voltmeter from layer 22 with the attachment of an appropriate slide contact between layers 17 and 22.

Figure 11:
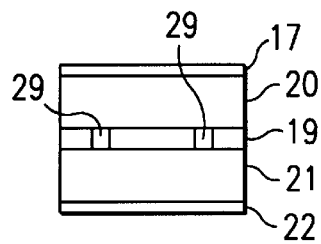
FIG. 11 represents an embodiment in which the middle conductive layer comprises a metal foil.

FIG. 11 is a cross-section of an elongate strip with a foil center conductor.

The use of foil 19 as shown in FIG. 11, can be especially beneficial as a center conductor. The foil 19 can be of any conductive material such as copper, brass or aluminum. It may also be a polymeric film coated with a conductive material. Holes 29 in the foil or film provide for flow of polymeric resin through the holes, strengthening the bond between the adjacent layers 20 and 21.

What we claim is:

1. A potentiometer assembly for determining linear position comprising:

an elongate strip comprised of first, second and third conductive layers of conductive polymeric material, each separated by a layer of nonconductive polymeric material;

a head assembly attached to one end of the elongate strip comprising wiring connecting the conductive layers; and a slide contact assembly slidable along the outer surfaces of said first and third conductive layers of the elongate strip, and one end of the elongate strip having a bias surface relative to and from the first conductive layer through the second conductive layer, and having a conductive resin placed on the bias surface connecting the first and second conductive layers.

2. The potentiometer assembly of claim 1, wherein the elongate strip comprises at least five total alternate layers of conductive and nonconductive polymeric material, the outer layers being conductive and containing therein mesophase pitch base carbon filters and filler fibers within polymeric resin, the conductive layers having a volume resistivity of between 0.05 and 15 ohm-cm, a total resistance along the effective length of the strip of at least 300 ohms and a linearity of resistivity along the length of the layer of less than about 5%.

3. The potentiometer assembly of claim 2 wherein the polymeric resin comprises a polyester and the conductive layers have a volume resistivity of between 0.05 and 1.0 ohm-cm, a total resistance of between 300 and 7500 ohms and a linearity of less than 3%.

4. The potentiometer unit of claim 2 wherein the conductive layers in the elongate strip comprise polyethylene terephthalate resin, mesophase pitch carbon fibers exhibiting a lamellae microstructure randomly disposed throughout at least the surface of each layer and fiberglass fibers, the elongate strip being compression molded from selected layers of batting containing said pitch based fibers, fiberglass fibers and resin, or fiberglass and resin.

5. The strip in the potentiometer assembly of claim 1 further comprising two additional layers of nonconductive resin such that there is a nonconductive layer on each side of the three conductive layers, and wherein a section of the outer nonconductive layers has been removed to the underlying conductive layer.

* * * * *